US008746117B2

(12) United States Patent
Kondo et al.

(10) Patent No.: US 8,746,117 B2
(45) Date of Patent: Jun. 10, 2014

(54) PRINTER

(75) Inventors: Tomoyuki Kondo, Shizuoka (JP); Takeshi Ogawa, Shizuoka (JP)

(73) Assignee: Star Micronics Co., Ltd., Shizuoka-Shi (JP)

( * ) Notice: Subject to any disclaimer, the term of this patent is extended or adjusted under 35 U.S.C. 154(b) by 259 days.

(21) Appl. No.: 13/439,115

(22) Filed: Apr. 4, 2012

(65) Prior Publication Data

US 2012/0272805 A1 Nov. 1, 2012

(30) Foreign Application Priority Data

Apr. 28, 2011 (JP) ................................ 2011-101201

(51) Int. Cl.
*B23D 31/00* (2006.01)
*B65H 39/00* (2006.01)

(52) U.S. Cl.
USPC ............................................. 83/112; 83/524

(58) Field of Classification Search
USPC ........... 83/109, 112, 524, 590, 196, 202, 203, 83/205, 242; 225/1
See application file for complete search history.

(56) References Cited

U.S. PATENT DOCUMENTS 135,609 A * 2/1873 Ward ............................ 83/561
1,471,571 A * 10/1923 Rubin ............................ 83/468
1,559,083 A * 10/1925 Friederici ....................... 83/600
2,601,506 A * 6/1952 Erhardt .......................... 83/231
2,649,056 A * 8/1953 Autenrieth ...................... 83/112
2,655,372 A * 10/1953 Hempel .......................... 33/741
3,074,607 A * 1/1963 Casey et al. ..................... 226/62
3,166,966 A * 1/1965 Ruschmann ...................... 83/262
4,385,538 A * 5/1983 Bieri et al. ...................... 83/169
6,386,415 B1 * 5/2002 Tsai ............................... 225/11
7,565,855 B2 7/2009 Malke
2003/0226868 A1 * 12/2003 Monden ......................... 225/39
2005/0127594 A1 6/2005 Mochizuki
2011/0063690 A1 3/2011 Miyazaki
2012/0104067 A1 * 5/2012 Pinto .............................. 225/56

FOREIGN PATENT DOCUMENTS

JP 2005-169958 6/2005

OTHER PUBLICATIONS

Extended European Search Report of the corresponding European application, EP Patent Application No. 12164535.2, (Jun. 28, 2013).

* cited by examiner

*Primary Examiner* — Sean Michalski
(74) *Attorney, Agent, or Firm* — Lexyoume IP Meister, PLLC

(57) ABSTRACT

Provided is a printer in which a cut-off paper is pushed into a paper stacking portion without an additional power source while reducing the maximum load applied to driving means for driving a movable blade. A printer includes a movable blade for cutting a paper disposed between a fixed blade and a movable blade as it moves in a forward direction and separating a printed part as a cut-off paper; driving means for moving the movable blade in a reciprocating manner; a pushing member which is driven to push a cut-off paper in a thickness direction of the cut-off paper; a paper stacking portion for stacking the cut-off paper pushed by the pushing member; and a driving force transferring mechanism for transferring a driving force of the driving means to the pushing member to drive the pushing member.

22 Claims, 10 Drawing Sheets

PRINTER

CROSS-REFERENCE TO RELATED APPLICATION

The present application claims priority to Japanese Patent Application No. 2011-101201 filed on Apr. 28, 2011, which is incorporated herein by reference as if reproduced in its entirety.

BACKGROUND OF THE INVENTION

The present invention relates to a printer including a movable blade for cutting paper disposed between a fixed blade and the movable blade, and a paper stacking portion for stacking cut-off papers thereon.

Conventionally, there has been a printer comprising a movable blade for cutting paper disposed between a fixed blade and the movable blade as it moves in a forward direction, driving means for driving the movable blade back and forth, and a paper stacking portion for stacking a plurality of pieces of paper cut by the movable blade thereon. Japanese Patent No. 4,192,083 discloses a printer configured to push paper toward the paper stacking portion by means of a front end portion of the movable blade as it moves in the forward direction for cutting. Further, U.S. Pat. No. 7,565,855 discloses a printer further including a pushing piece reciprocating with the movable blade and configured to push paper toward the paper stacking portion as the pushing piece moves in the forward direction along with the movable blade moving in the forward direction for cutting. These printers have an advantage of not requiring an additional power source for pushing the paper.

SUMMARY

However, both the above conventional printers are configured to push the paper toward the paper stacking portion by using the forward movement of the movable blade for cutting. Therefore, when the movable blade moves in the forward direction, both of a load caused by cutting of the paper and a load caused by the operation of pushing the paper are applied to the driving means for driving the movable blade.

In order to solve the problem, an object of the present invention is to provide a printer capable of pushing a cut-off paper toward a paper stacking portion without an additional power source while reducing the maximum load applied to driving means for driving a movable blade.

To achieve the above object, according to the present invention, a printer is provided, in which paper is drawn from a roll of paper and a part of the paper having been printed is cut and separated as a cut-off paper, including a movable blade for cutting the paper disposed between a fixed blade and the movable blade as it moves in a forward direction and thereby separating the printed part of the paper as a cut-off paper, driving means for moving the movable blade in a reciprocating manner, a pushing member that is driven to push the cut-off paper in a thickness direction of the paper, a paper stacking portion for stacking the cut-off paper pushed by the pushing member in a stacked manner, and a driving force transferring mechanism for transferring a driving force of the driving means to the pushing member to drive the pushing member.

In the printer of the present invention, the cut-off paper is pushed toward the paper stacking portion without an additional driving source for driving the pushing member.

Further, in the printer of the present invention, the driving force transferred from the driving means to the pushing member is a driving force for moving the movable blade in a backward direction.

In the printer of the present invention, since the driving force for moving the movable blade in a backward direction is used to drive the pushing member, the maximum load applied to the driving means can be reduced by distributing the load applied to the driving means in the forward direction and the backward direction.

Herein, the pushing member may have a protruding piece. The protruding piece contacts the cut-off paper in a length direction of the cut-off paper and rotates to push the cut-off paper in the paper thickness direction.

Further, in the printer of the present invention, the driving force transferring mechanism may include a transfer preventing unit for preventing the driving force from being transferred to the pushing member when the driving means moves the movable blade in the forward direction.

According to the above configuration, since the load to drive the pushing member does not occur on the driving means when the movable blade moves in the forward direction, the load applied to the driving means can be reduced.

As a preferable aspect, the printer of the present invention may further include a discharge port through which the printed part is discharged, wherein the pushing member is rotatably mounted in the proximity of either end of the discharge port and on the paper stacking portion side thereof, and the pushing member is configured to guide the printed part of the paper discharged from the discharge port in a discharging direction and then push the cut-off paper in the pushing direction when the pushing member is rotatably driven by the driving force transferring mechanism.

According to the aspect, it is possible for the pushing member to guide the printed part discharged from the discharge port in a discharging direction as well as to push the printed cut-off paper toward the paper stacking portion.

Further, the pushing member also serves to prevent a front end of the printed part discharged from the discharge port from interfering with the cut-off papers stacked in the paper stacking portion.

In addition, the driving force transferring mechanism may include a transfer releasing unit for releasing the transfer of the driving force to the pushing member when a load caused by an operation of the pushing member is equal to or larger than a predetermined load.

The transfer releasing unit is provided to prevent the driving means from being damaged even though a load caused by operating the pushing member increases.

Further, the paper stacking portion may have a concave portion which is recessed in the same direction as the pushing member pushes the cut-off paper, and the concave portion is adapted to receive a cut end portion of the cut-off paper that tends to be curled.

The cut end portion of the cut-off paper having the tendency to be curled is received in the concave portion so as to prevent the cut-off paper from exceedingly protruding toward the pushing member to hinder the pushing operation thereof.

The printer of the present invention may further include a stacker unit, which has the paper stacking portion, for stacking the cut-off paper in a standing posture in the paper stacking portion, wherein the stacker unit includes a guide member against which one of the cut-off papers stacked in the paper stacking portion that is positioned at the most downstream side in the pushing direction stands, a press member adapted to contact a surface of one of the cut-off papers stacked in the paper stacking portion that is positioned at the most upstream side in the pushing direction, and a retracting mechanism for retracting the guide member in the pushing direction so that the press member contacts the surface of the cut-off paper positioned at the most upstream side in a predetermined angle range.

When an angle of the press member contacting the cut-off paper positioned at the most upstream side in the pushing direction (hereinafter referred to as an n-th stacked cut-off paper) with respect to the n-th stacked cut-off paper is excessively large, the front end of the discharged printed part of the paper may not be inserted between the surface of the n-th stacked cut-off paper and the press member. On the contrary, when the angle of the press member contacting the n-th stacked cut-off paper is excessively small, the force of the press member to press the cut-off papers stacked in the paper stacking portion decreases. This may cause the stacked cut-off papers to be convex or concave in an opposite direction to the pushing direction. According to the present invention, since the angle of the press member with respect to the surface of the n-th stacked cut-off paper can be held in a predetermined angle range, the front end of the printed part is sure to be inserted between the surface of the n-th stacked cut-off paper and the press member. Further, the force of the press member to press the stacked cut-off papers can be prevented from being significantly changed. Herein, n is a positive integer equal to or more than 1.

Herein, the stacker unit may include a guide member in contact with a rear surface of the cut-off paper positioned at the most downstream side in the pushing direction among the cut-off papers stacked in the paper stacking portion, a press member adapted to contact the surface of the cut-off paper positioned at the most upstream side in the pushing direction among the stacked cut-off papers, and a retracting mechanism for retracting the guide member in the pushing direction so that the press member contacts the surface of the cut-off paper positioned at the most upstream side within a predetermined angle range.

According to the printer of the present invention, the cut-off papers can be pushed toward the paper stacking portion without an additional power source while reducing the maximum load applied to the driving means that moves the movable blade.

BRIEF DESCRIPTION OF DRAWINGS

FIGS. 7*a*~7*d* are side views of the stacker-side driving force transferring mechanism viewed from the right side in FIG. 6, wherein FIG. 7*a* is a diagram showing a state in which the cover frames are closed, FIG. 7*b* is a diagram showing a state right before the cover frames are switched from an opened state to the closed state, FIG. 7*c* is a diagram showing a state in which a joint is removed from a connection pin of a U-shaped arm, and FIG. 7*d* is a diagram showing a state in which a guiding slope of the joint is in contact with the connection pin.

FIGS. 8*a*~8*c* are plan views for illustrating behavior of the driving force transferring mechanism and the impeller when the driving means drive the movable blade back and forth, wherein FIG. 8*a* is a diagram showing a state when the movable blade moves in the forward direction, FIG. 8*b* is a diagram showing a state when the movable blade is at the most forward position, and FIG. 8*c* is a diagram showing a state when the movable blade moves in the backward direction.

FIGS. 10*a*~10*c* are plan views showing a state in which the impeller rotates to press the cut-off paper in the thickness direction, wherein FIG. 10*a* is a diagram showing a state right before the impeller begins rotating, FIG. 10*b* is a diagram showing a state in which the impeller is rotating, and FIG. 10*c* is a diagram showing a state in which the impeller completes the rotating.

DETAILED DESCRIPTION

Hereinafter, embodiments of the present invention will be described with reference to the accompanying drawings.

A printer as an embodiment of the present invention may be a thermal printer adapted to draw out paper from a paper roll which is made by rolling an elongated heat sensitive paper and the like in a roll shape, perform printing on the paper, and cut a printed part of the paper.

Figure 1:
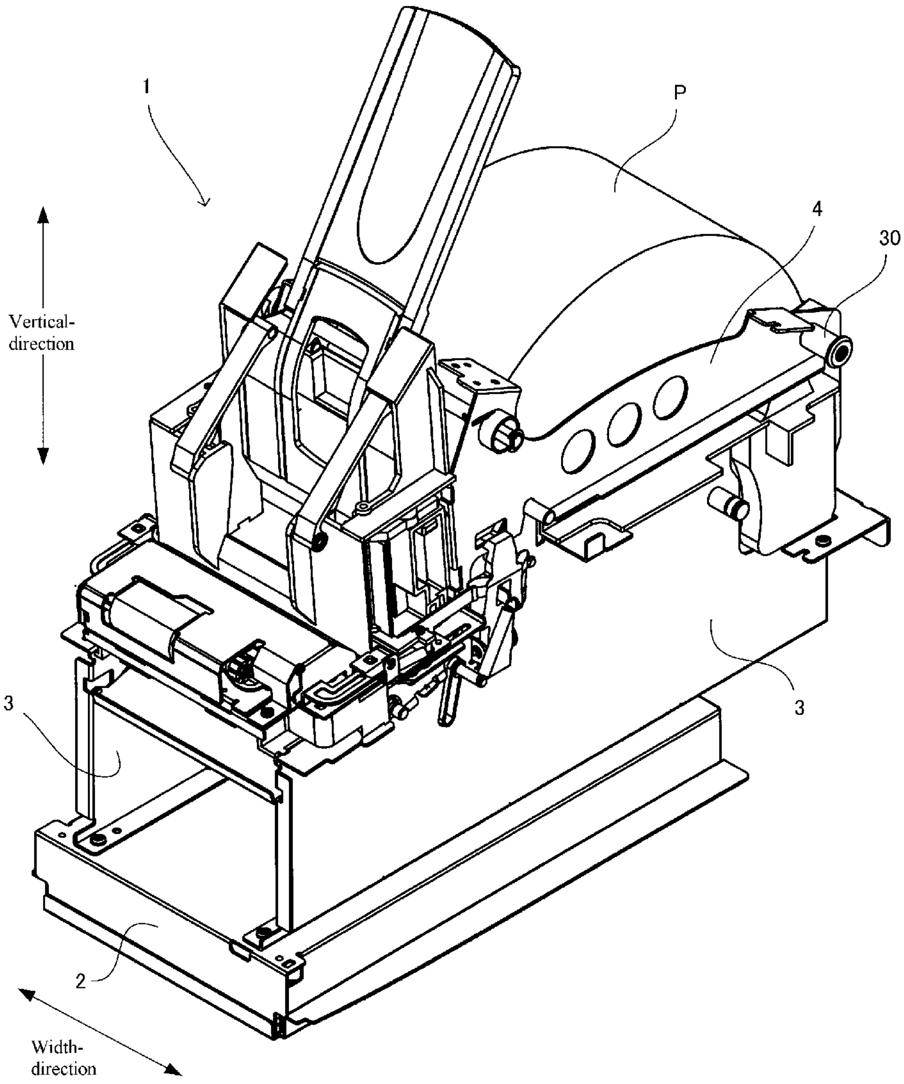
FIG. 1 is a front perspective view of a printer 1 according to an embodiment of the present invention, which is viewed from a diagonally upper right.

FIG. 1 is a front perspective view of a printer 1 according to an embodiment of the present invention, which is viewed from a diagonally upper right. Herein, a horizontal direction of the printer 1 (a direction perpendicular to a paper plane in FIG. 3) may be called a width direction.

As shown in FIG. 1, the printer 1 includes a base chassis 2 having a power supply or a control board embedded therein, a pair of left and right body frames 3 fixed to the base chassis 2, and a pair of left and right cover frames 4 rotatably coupled to the body frames 3. The cover frames 4 are rotatable on a cover support pivot 30 arranged to the body frames 3. FIG. 1 shows a closed state in which the cover frames 4 are closed to the body frames 3. The printer 1 is switched from the closed state shown in FIG. 1 to an opened state by the upward rotation of the cover frames 4.

Figure 2:
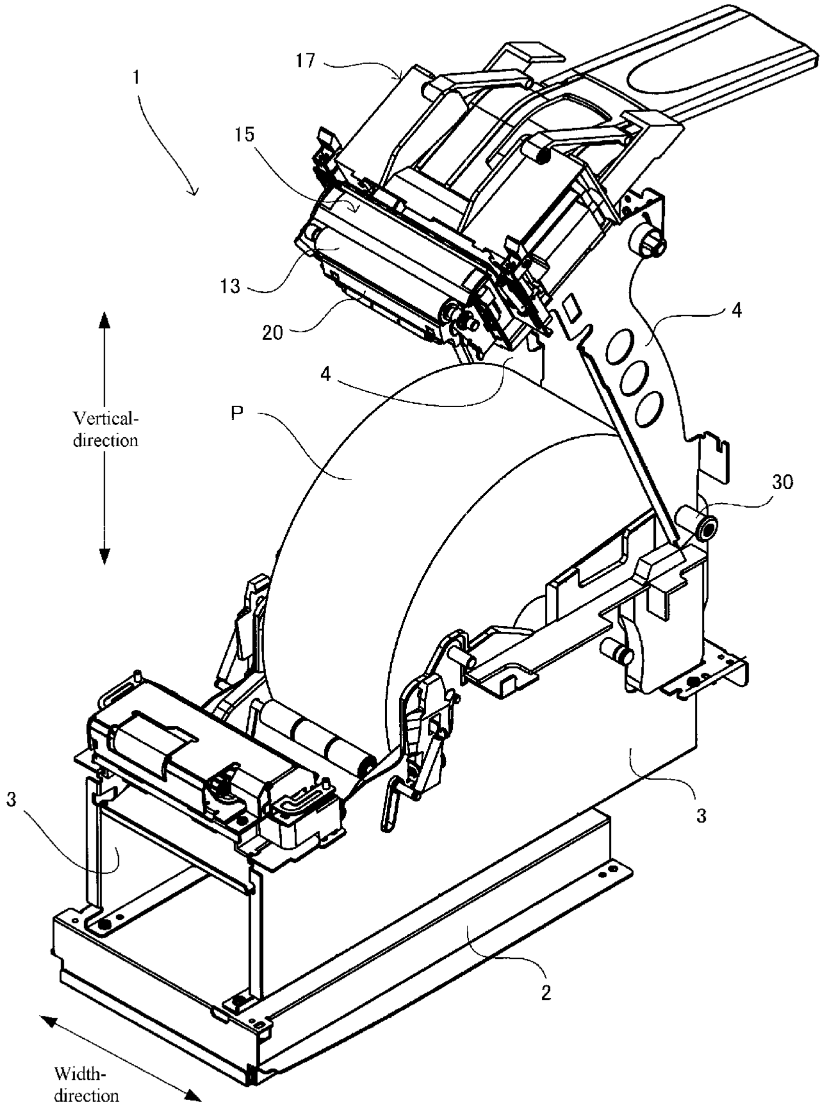
FIG. 2 is a front perspective view showing an opened state in which the cover frames of the printer shown in FIG. 1 are pivoted upward.

FIG. 2 is a perspective view showing the opened state in which the cover frames 4 of the printer 1 shown in FIG. 1 are rotated upwardly.

A platen roller 13, an opposite unit 15, a stacker unit 17, and an upper conveyance guide 20 are mounted on the cover frames 4 as shown in FIG. 2. The opposite unit 15 among these components mounted on the cover frames 4 is a so-called optional unit which can be attached to and detached from the printer as needed. FIG. 2 shows the printer 1 with the opposite unit 15. The platen roller 13, the opposite unit 15, the stacker unit 17, and the upper conveyance guide 20 are moved upwardly together with the cover frames 4 when the cover frames 4 are moved to the opened state as shown in FIG. 2.

Figure 3:
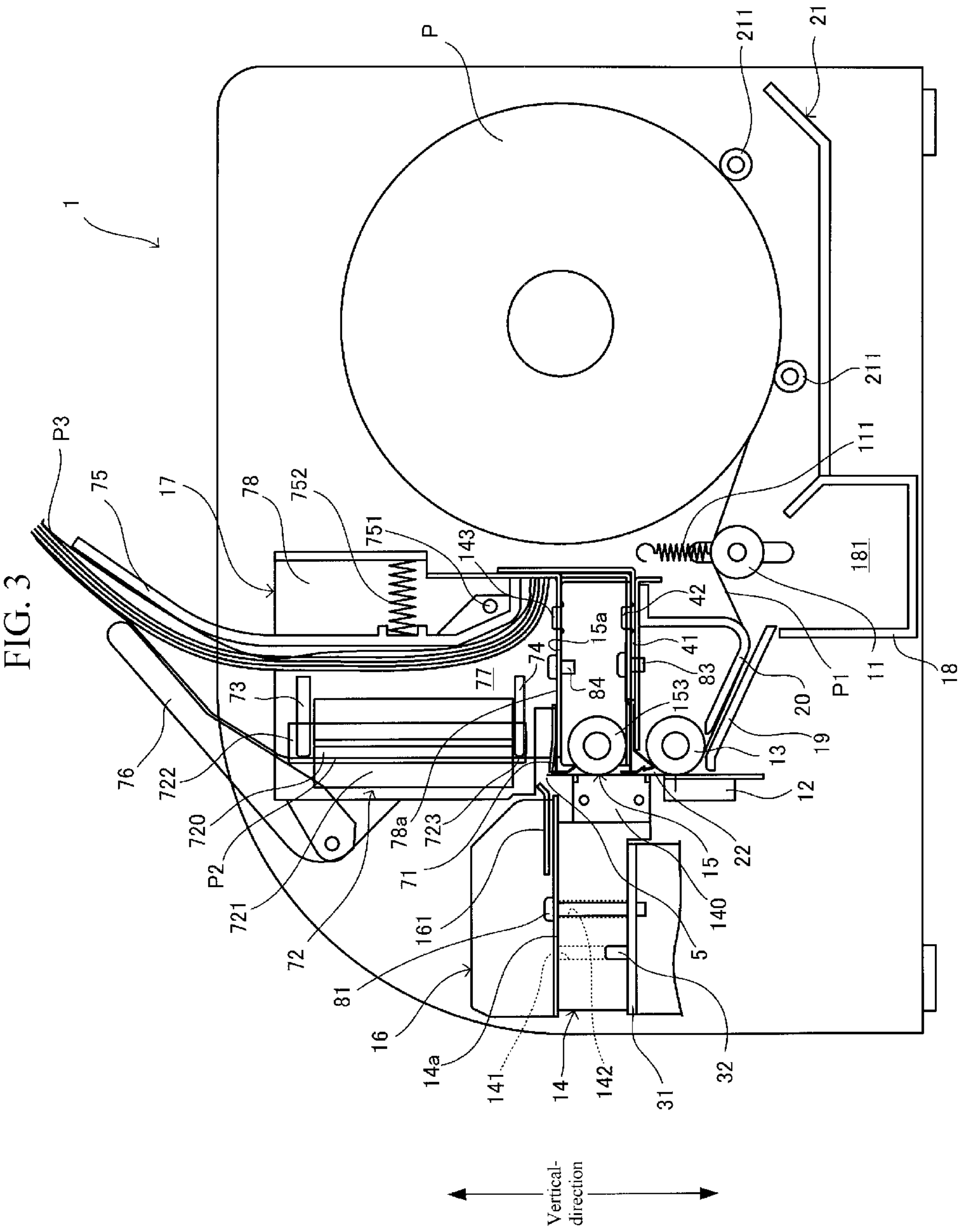
FIG. 3 is a schematic diagram of primary components of the printer viewed from the side of the printer.

FIG. 3 is a schematic diagram of primary components of the printer 1 viewed from the side of the printer 1.

A damper roller 11, a printing head 12, a reading unit 14, a movable blade unit 16, a paper retracting portion 18, a lower conveyance guide 19, and a paper roll housing portion 21 are mounted on the body frames 3 as shown in FIG. 3. The reading unit 14 among these components mounted on the body frames 3 is a so-called optional unit to be used as a set together with the opposite unit 15, which can be attached to and detached from the printer as needed. FIG. 3 shows the printer 1 with the reading unit 14 and the opposite unit 15. A space between each component mounted on the body frames 3 and each component mounted on the cover frames 4 serves as a paper path 22 along which paper P1 drawn out from the paper roll P is conveyed. Two rollers 211 are arranged in the paper roll housing portion 21. The paper roll P is placed on the rollers 211 and is thereby rotatably housed in the body frames 3. Further, though the paper roll is supported by using two rollers 211 arranged in the paper roll housing portion 21 in this embodiment, more than two rollers 211 may be provided to support the paper roll, or, alternatively, the paper roll may be supported not by rollers but by a belt. Further, two sets of roller pairs (each roller pair including two rollers placed adjacent to each other) may be used instead of the rollers 211. The roller pairs may be swingably constructed depending on a diameter or movement of the paper roll to stably hold the paper roll.

Hereinafter, as long as it is not particularly indicated to the contrary, the printer 1 in which the cover frames 4 are in the closed state will be described. The printing head 12 is a thermal head with a plurality of heat emitting elements. The printing head 12 is mounted on the body frames 3 so as to movable within a predetermined range in a horizontal direction in FIG. 3. The platen roller 13 is disposed opposite to the printing head 12 with the paper path 22 therebetween. The printing head 12 is normally urged toward the platen roller 13 (to the right in a horizontal direction in FIG. 3) by a head spring (not shown). The platen roller 13 is rotatably mounted on the cover frames 4 on its own shaft center. Further, the platen roller 13 is driven by a paper feed motor (not shown) to rotate clockwise (hereinafter referred to as a forward rotation) or counterclockwise (hereinafter referred to as a reverse rotation) in FIG. 3. The paper P1 drawn out from the paper roll P is caught between the printing head 12 and the platen roller 13, and conveyed in a forward paper feed direction by the forward rotation of the platen roller 13. Further, the paper P1 is conveyed in a reverse paper feed direction opposite to the forward paper feed direction by the reverse rotation of the platen roller 13. Printing as desired is performed by applying heat to the paper P1 passing between the printing head 12 and the platen roller 13 by means of the heat emitting elements of the printing head 12.

The lower conveyance guide 19, which is fixed to the body frames 3, is arranged on the upstream side of the printing head 12 in the paper feed direction. The upper conveyance guide 20 is fixed to the cover frames 4. A gap between the lower conveyance guide 19 and the upper conveyance guide 20 is twice to four times as large as the thickness of the paper P1. The paper P1 drawn out from the paper roll P is guided by the lower conveyance guide 19 and the upper conveyance guide 20 to go between the printing head 12 and the platen roller 13.

The damper roller 11 which is vertically movable within a predetermined movement range is arranged on an upstream side of the lower conveyance guide 19 and the upper conveyance guide 20 in the paper feed direction. The damper roller 11 is normally urged upward by a damper spring 111. The paper P1 drawn out from the paper roll P contacts the damper roller 11, and thereby the contact portion of the paper P1 with the damper roller 11 is pushed upward. Further, when the paper P1 is conveyed in the forward paper feed direction, the damper roller 11 is pushed downward against the force of the damper spring 111 by the tension force of the paper P1 developed by the paper conveyance. When the paper P11 is somewhat slack on an upstream side of the printing head 12, the damper roller 11 is moved upward to absorb the slack.

Below the damper roller 11, the paper retracting portion 18 is arranged away from the paper path 22 along which the paper P1 passes when being conveyed in the forward paper feed direction. The paper retracting portion 18 has a paper retracting space 181 therein for accommodating the paper P1 conveyed in the reverse paper feed direction. When the paper P1 is conveyed in the reverse paper feed direction, the damper roller 11 is moved upward while absorbing the slack of the paper P1 developed on the upstream side of the printing head 12. If the paper P1 is still conveyed in the reverse paper feed direction even after the damper roller 11 reaches the uppermost point of the movement range, the slack of the paper P1 is further developed. The developed paper slack is guided toward the paper retracting space 181 below the damper roller 11 by the damper roller 11 at the uppermost point. As a result, the paper slack loops into the paper retracting space 181 to be accommodated there.

The body frames 3 are provided with a body-side attachment portion 31, to which either one of the reading unit 14 and the movable blade unit 16 is attached. The body-side attachment portion 31 is provided with a positioning shaft 32 for positioning the reading unit 14 or the movable blade unit 16. FIG. 3 shows the printer 1 in which the reading unit 14 is attached to the body-side attachment portion 31.

The reading unit 14 includes an optical sensor 140 capable of optically reading a printed part of the paper P1 where the printing is performed by the printing head 12. Further, the reading unit 14 is provided with a positioning hole 141, which serves as a positioning reference at the time of attaching the reading unit 14 to the body-side attachment portion 31. The positioning hole 141 is engaged with the positioning shaft 32, and thereby the reading unit 14 is positioned with respect to the body-side attachment portion 31. Further, the reading unit 14 is provided with a through-hole 142, through which an elongated screw 81 passes for attaching the reading unit 14 to the body-side attachment portion 31. The reading unit 14 attached to the body-side attachment portion 31 is disposed on a downstream side of the printing head 12 in the paper feed direction.

A top surface of the reading unit 14 includes a movable blade unit attachment portion 14*a* for the movable blade unit 16 to be stacked thereon. The movable blade unit attachment portion 14*a* is provided with a positioning shaft (not shown) for positioning the movable blade unit 16. The movable blade unit 16 is provided with a positioning hole (not shown). The positioning hole is engaged with the positioning shaft of the movable blade unit attachment portion 14*a*, and thereby the movable blade unit 16 is positioned with respect to the movable blade unit attachment portion 14*a*. The movable blade unit 16 is detachably attached to the body-side attachment portion 31 by the elongated screw 81 with the reading unit 14 sandwiched therebetween. The reading unit 14 and the movable blade unit 16 can be detached from the body-side attachment portion 31 by removing the elongated screw 81. Since the movable blade unit 16 is stacked on the reading unit 14, the movable blade unit 16 is disposed on a downstream side of the reading unit 14 in the paper feed direction. The movable blade unit 16 is positioned with respect to the movable blade unit attachment portion 14*a* and attached to the body-side attachment portion 13 together with the reading unit. This position of the movable blade unit 16 corresponds to one example of the "second position".

Further, the movable blade unit 16 includes a movable blade 161. Since the movable blade unit 16 is positioned with respect to the movable blade unit attachment portion 14*a* and attached to the body-side attachment portion 31, the movable blade 161 is disposed at a predetermined position of the body frames 3.

The cover frames 4 are provided with a cover-side attachment portion 41, to which either one of the opposite unit 15 and the stacker unit 17 is detachably attached. FIG. 3 shows the printer 1 in which the opposite unit 15 is attached to the cover-side attachment portion 41. The cover-side attachment portion 41 is provided with a protrusion portion 42 for positioning the opposite unit 15 or the stacker unit 17 with respect to the cover-side attachment portion 41.

As described above, the opposite unit 15 is an optional unit used as a set together with the reading unit 14. The opposite unit 15 is disposed at a position on a downstream side of the printing head 12 in the paper feed direction and is opposite to the reading unit 14 with the paper path 22 therebetween. The opposite unit 15 is provided with a positioning hole (not shown), which serves as a reference at the time of attaching the opposite unit 15 to the cover-side attachment portion 41. The positioning hole is engaged with the protrusion portion 42, and thereby the opposite unit 15 is positioned with respect to the cover-side attachment portion 41. The opposite unit 15 is detachably attached to the cover-side attachment portion 41 by the screw 83. The opposite unit 15 is detached from the cover-side attachment portion 41 by removing the screw 83.

The opposite unit 15 has a contact roller 153 urged toward the reading unit 14 by a contact spring (not shown). The contact roller 153 is larger in diameter at the ends in the width direction than at the center by approximately twice the thickness of the paper P1. The contact roller 153 is urged by the contact spring such that the both ends of the contact roller 153 in the width direction, which have a larger diameter, contact the both ends of the optical sensor 140 in its width direction. A gap through which the paper P1 passes is formed between the center part of the contact roller 153 and the center part of the optical sensor 140 in the width direction. Further, although the contact roller 153 is used in the embodiment, a contact plate in the shape of a plate may be used instead of the contact roller 153.

A top surface of the opposite unit 15 includes a stacker unit attachment portion 15*a* for the stacker unit 17 to be stacked thereon. The stacker unit attachment portion 15*a* is provided with a stacker protrusion portion 143 for positioning the stacker unit 17. The stacker unit 17 is provided with a first positioning hole (not shown). The stacker unit 17 is further provided with a second positioning hole (not shown) for positioning the stacker unit 17 with respect to the cover-side attachment portion 41. The first positioning hole is engaged with the stacker protrusion portion 143 of the stacker unit attachment portion 15*a* so that the stacker unit 17 is positioned with respect to the stacker unit attachment portion 15*a* and simultaneously stacked on the opposite unit 15. Further, the stacker unit 17 is detachably attached to the stacker unit attachment portion 15*a* by a screw 84. The stacker unit 17 is detached from the stacker unit attachment portion 15*a* by removing the screw 84. The stacker unit 17 is attached to the stacker unit attachment portion 15*a* while stacked on the opposite unit 15. As a result, the stacker unit 17 is disposed on a downstream side of the opposite unit 15 in the paper feed direction. The stacker unit 17 is attached to the stacker unit attachment portion 15*a* of the opposite unit 15 that is attached to the cover-side attachment portion 41. This position of the stacker unit 17 corresponds to one example of the "fourth position". Further, the stacker protrusion portion 143 of the opposite unit 15 may be formed at the position corresponding to the second positioning hole. In this case, the stacker unit 17 can be positioned by the second positioning hole when the stacker unit 17 is attached to the stacker unit attachment portion 15*a*, and thus the first positioning hole is not required.

A fixed blade 71 is fixed on a top surface of a lower plate 78*a* of a stacker frame 78 of the stacker unit 17. Since the stacker unit 17 is attached to the opposite unit 15 while being positioned with the stacker unit attachment portion 15*a*, the fixed blade 71 is disposed at an opposite position to the movable blade 161 which is disposed at a predetermined position with the paper P1 therebetween. A gap between the edge of the fixed blade 71 and the edge of the movable blade 161 serves as a discharge port 5 for discharging a printed part of the paper P1, on which printing has been done by the printing head 12.

The stacker unit 17 includes the fixed blade 71, an impeller 72 corresponding to one example of the "pushing member", an angle retention mechanism 73, a stacker-side driving force transferring mechanism 74, a guide member 75, a press member 76, a paper stacking portion 77, and the stacker frame 78.

The impeller 72 is mounted on the stacker frame 78 to be rotatable around its shaft center, with the shaft center being along a discharging direction (upward in FIG. 3) of the printed part of the paper P1 discharged from the discharge port 5. The impeller 72 is a resin-made member in which a shaft member 720, four sets of blades 721 that extend radially from the shaft member 720, an upper ratchet gear 722 disposed at an upper end portion of the shaft member 720, and a lower ratchet gear 723 disposed at a lower end portion of the shaft member 720 are integrally molded. The impeller 72 is mounted in the proximity of either end of the discharge port 5 in the width direction. There are two impellers 72 in total. The printed part of paper discharged from the discharge port 5 is guided toward the press member 76 in the discharging direction by the blade 721 that protrudes most inwardly in the width-direction (a direction perpendicular to the paper plane in FIG. 3) of the impeller 72. The cut-off paper P2 that is separated from a non-discharged part of the paper P1 by the fixed blade 71 and the movable blade 161 is pushed in a thickness direction of the cut-off paper P2 (to the right in FIG. 3) by the rotation of the impeller 72.

The guide member 75 is spaced from the impeller 72 in the direction in which the impeller 72 pushes the cut-off paper P2 (hereinafter, referred to as the pushing direction). The space between the position where the impeller 72 finishes pushing the cut-off paper P2 and the guide member 75 defines the paper stacking portion 77 accommodating the cut-off paper P2 in a stacked manner. Among the stacked papers P3 stacked in the paper stacking portion 77, the first sheet positioned at the most downstream side in the pushing direction stands against the guide member 75. The guide member 75 is disposed at a position spaced upwardly from the lower plate 78*a* of the stacker frame 78 by a predetermined distance. Further, the guide member 75 is mounted on the stacker frame 78 to be rotatable around a guide member supporting shaft 751 as a center of rotation, with the guide member supporting shaft having a shaft center in the width direction. A guide spring 752 is provided between the guide member 75 and the stacker frame 78. The guide member 75 is normally urged in a counterclockwise direction in FIG. 3 by the guide spring 752. When several sheets of the cut-off paper P3 are stacked in the paper stacking portion 77, own weight of the paper causes the guide member 75 to rotate in a clockwise direction in FIG. 4 against the force of the guide spring 752. An upper part of the guide member 75 is thereby retracted in the pushing direction.

Figure 4:
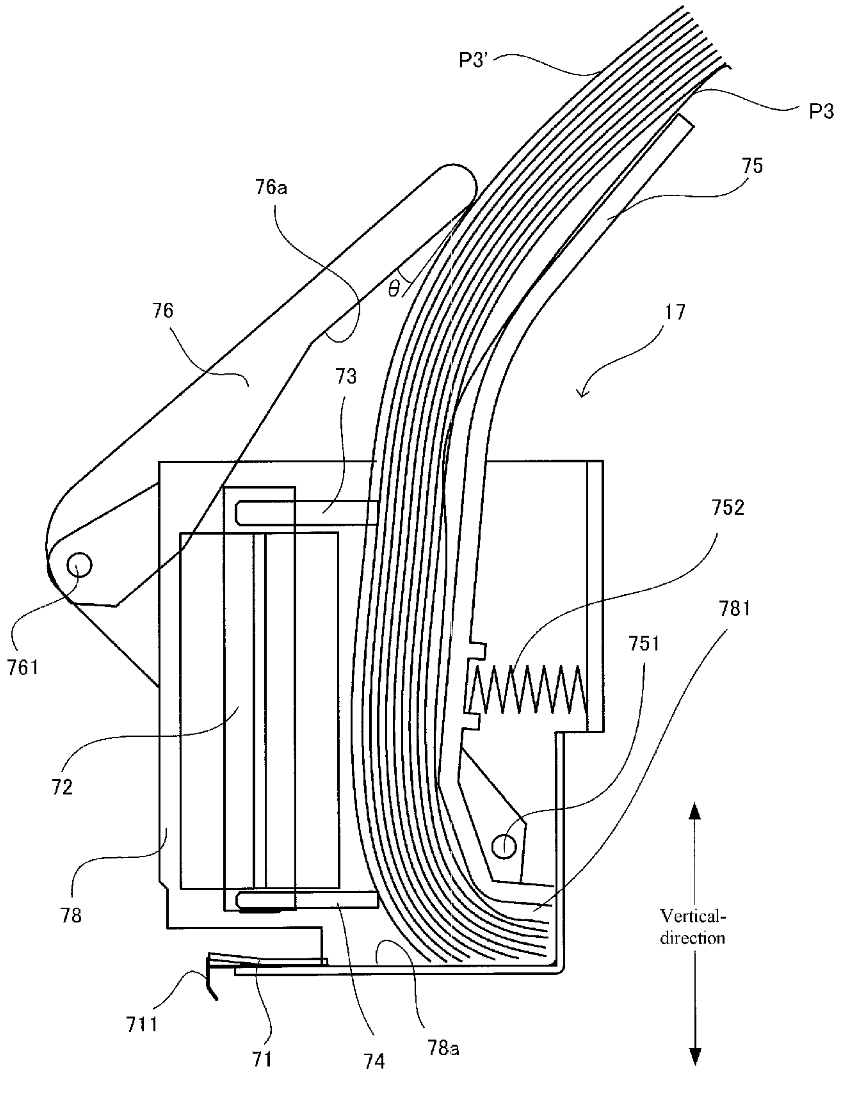
FIG. 4 is a side view showing the stacker unit when several sheets of cut-off paper are stacked in the paper stacking portion.

FIG. 4 is a side view showing the stacker unit 17 when several sheets of the cut-off paper P3 are stacked in the paper stacking portion 77.

The press member 76 is mounted on the stacker frame 78 to be rotatable on a press member supporting shaft 761 as a center of rotation, with the press member supporting shaft having a shaft center in the width direction. A bottom surface 76*a* of the press member 76 serves as a guide surface for guiding a printed part of the paper discharged above the impeller 72 in an upper right direction in FIG. 4. The press member 76 rotates in the clockwise direction in FIG. 4 by its own weight and contacts the last sheet of the stacked cut-off papers P3 (hereinafter referred to as an n-th stacked cut-off paper P3; n is a positive integer representing the number of the stacked cut-off papers P3) that is positioned at the most upstream side in the pushing direction. The stacked cut-off papers P3 in the paper stacking portion 77 are pressed toward the guide member 75 by the weight of the press member 76. An angle θ at which the press member 76 contacts the n-th stacked cut-off paper P3' is determined at a position where the press member 76 contacts the n-th stacked cut-off paper P3'. As described above, as the number of the stacked cut-off papers P3 increases, the upper part of the guide member 75 is retracted in the pushing direction. Thereby, the angle θ at which the press member 76 contacts the n-th stacked cut-off paper P3' is retained within a predetermined range even though the number of stacked cut-off papers P3 increases.

The printed part of paper discharged above the impeller 72 is guided to the bottom surface 76*a* of the press member 76 to proceed between the press member 76 and the n-th stacked cut-off paper P3'. When the angle θ at which the press member 76 contacts the n-th stacked cut-off paper P3' becomes excessively large, a front end of the discharged printed part cannot easily proceed between the press member 76 and the surface of the n-th stacked cut-off paper P3', and as a result, the front end may be rolled in the paper stacking portion 77. Further, when the angle θ at which the press member 76 contacts the n-th stacked cut-off paper P3' is larger, the press member 76 is rotated a larger amount in the clockwise direction in FIG. 4. As the press member 76 is rotated a larger amount, the force of the press member 76 pressing the stacked cut-off papers P3 becomes larger. Therefore, a friction force between the proceeding printed part of paper and the n-th stacked cut-off paper P3' also becomes larger. Due to the large frictional force, the n-th stacked cut-off paper P3' may be lifted up along with the movement of the printed paper being discharged.

On the contrary, when the angle θ at which the press member contacts the n-th stacked cut-off paper P3' becomes excessively small, the force of the press member 76 pressing the stacked cut-off papers P3 becomes smaller, and as a result, the stacked cut-off papers P3 may become convex or concave in an opposite direction to the pushing direction. In this embodiment, since the angle θ at which the press member 76 contacts the n-th stacked cut-off paper P3' is retained within a predetermined range, the front end of the printed part of paper, while being discharged, may be guided well to proceed between the press member 76 and the surface of the n-th stacked cut-off paper P3'. Further, the force of the press member 76 pressing the stacked cut-off papers P3 may be prevented from being largely changed. It may be noted that, though the guide member 75 in this embodiment is configured to be rotatable, the guide member 75 may be alternatively configured to move in parallel in the pushing direction.

A concave portion 781 which is depressed in the pushing direction is formed between the guide member 75 and the lower plate 78*a* of the stacker frame 78. The stacked cut-off papers P3 tend to curl in a rolling direction of the paper roll P. In particular, when the paper roll P is tightly rolled, such curling strongly occurs. The concave portion 781 is a space for receiving cut end portions (trailing end portions) of the stacked cut-off papers P3. If the stacked cut-off papers P3 protrude too much toward the pushing member due to curling, the stacked cut-off papers P3 and the impeller 72 touch each other and the pushing operation of the impeller 72 is disturbed. Since the concave portion 781 is shaped conforming to paper curl, the curled cut end portions of the stacked cut-off papers P3 are allowed to protrude in the pushing direction. Therefore, the stacked cut-off papers P3 can be prevented from protruding too much toward the pushing member due to curling. Further, after being discharged from the discharge port 5 by a predetermined length, the printed part of the paper moves upward while contacting the n-th stacked cut-off paper P3'. While the printed part is being discharged, a force pushing upward acts on the n-th stacked cut-off paper P3' by the friction force between the printed part being discharged and the n-th stacked cut-off paper P3'. In this embodiment, the curled cut end portions of the stacked cut-off papers P3 that are received in the concave portion 781 tend to be in a hook shape in a side view. The hook-shaped portion of the n-th stacked cut-off paper P3' is suspended by the hook-shaped portions of the stacked cut-off papers P3 that are stacked on a downstream side in the pushing direction, and thereby the n-th stacked cut-off paper P3' may be prevented from moving upward. Further, a fixed blade guide 711 is disposed between a top surface of the lower plate 78*a* of the stacker frame 78 and the bottom surface of the fixed blade 71. The fixed blade guide 711 guides the paper P1 to proceed between the fixed blade 71 and the movable blade 161.

Figure 5:
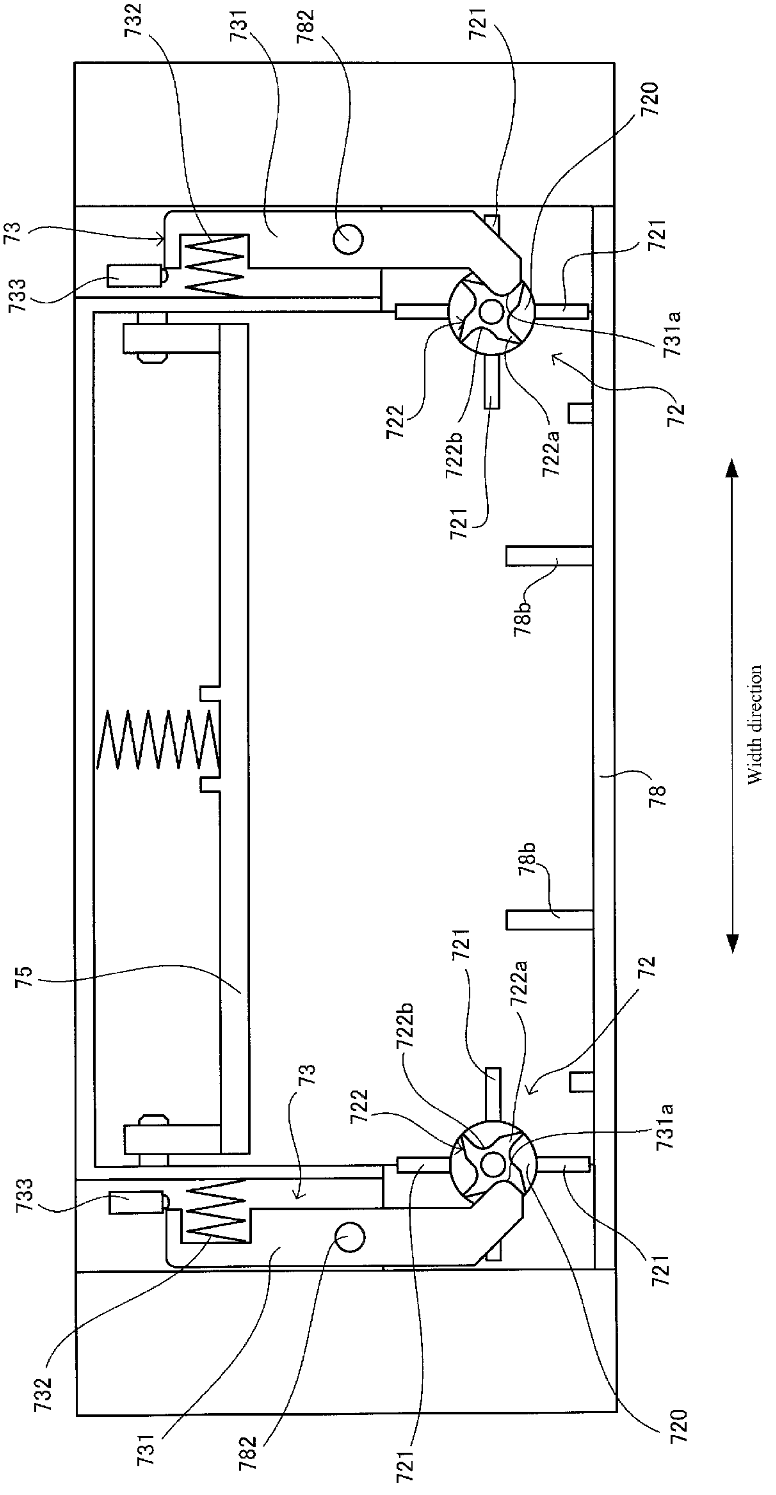
FIG. 5 is a plan view showing an impeller and an angle retention mechanism.

FIG. 5 is a plan view showing the impeller 72 and the angle retention mechanism 73. Further, in FIG. 5, the stacker frame 78 and the guide member 75 are also shown.

As shown in FIG. 5, four sets of blades 721 of the impeller 72 extend radially at an interval of 90 degrees from the shaft member 720. A vertical length of the blade 721 is half or longer than the minimum length of the stacked cut-off papers P3 set in the printer 1. A pair of the impellers 72 are provided in the proximity of the ends of the discharge port 5 and on the paper stacking portion 77 side thereof (see FIG. 3).

The angle retention mechanism 73 holds the impeller 72 at a predetermined rotational angle with a predetermined force. As shown in FIG. 5, the angle retention mechanism 73 is horizontally symmetrically provided with respect to each of two impellers 72. Hereinafter, the angle retention mechanism 73 on the right side in FIG. 5 will be described and a description of the angle retention mechanism 73 on the left side in FIG. 5 will be omitted. An upper arm supporting shaft 782 having a shaft line in a vertical direction (a direction perpendicular to a paper plane in FIG. 5) is mounted on the stacker frame 78. The angle retention mechanism 73 includes an upper arm 731, which is rotatable on the upper arm supporting shaft 782 as a center of rotation, an upper ratchet spring 732 normally urging the upper arm 731 toward the clockwise direction in FIG. 5, and a detection switch 733.

Figure 6:
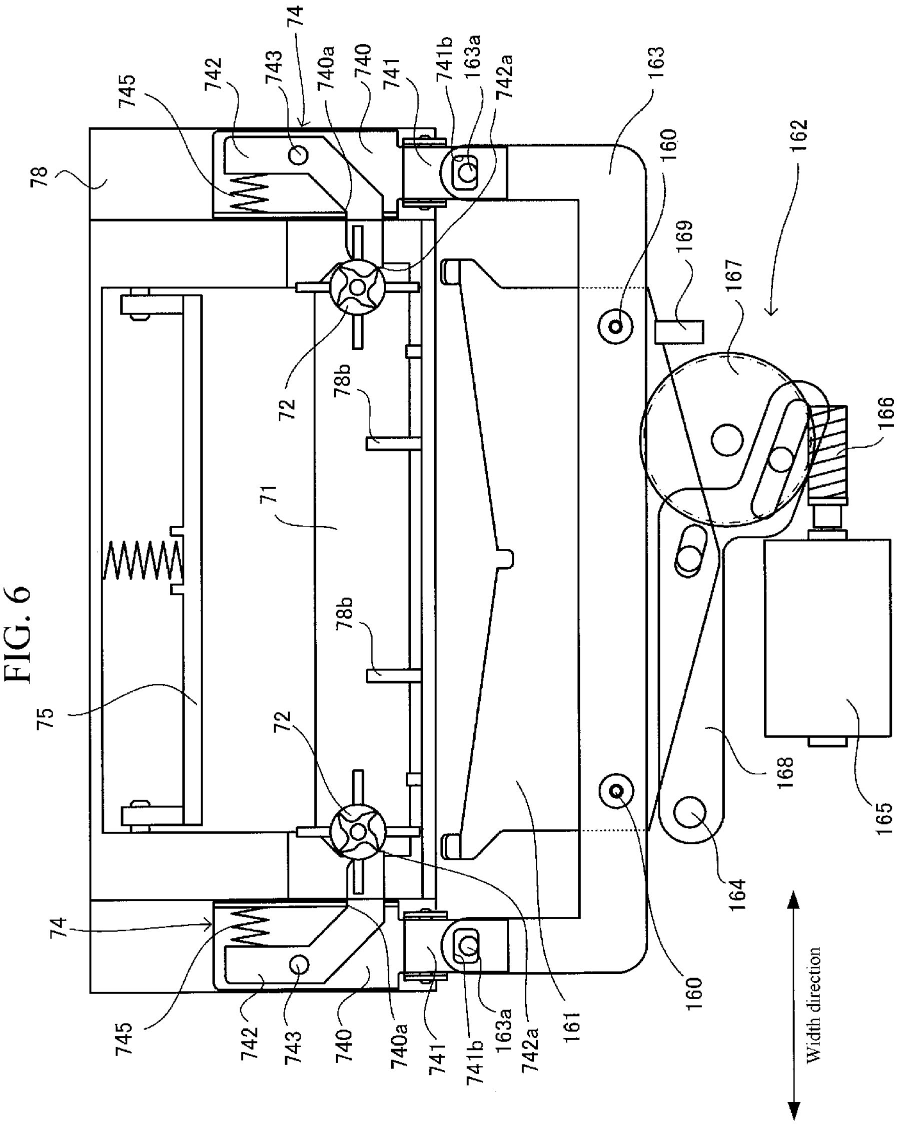
FIG. 6 is a plan view showing mechanism components arranged in the movable unit and a stacker-side driving force transferring mechanism.

The upper ratchet gear 722 includes four upper gear portions 722*a*, each of which is deviated from each of four blades 721 by substantially 45 degrees, and four upper gear bottoms 722*b*, each of which is disposed at substantially the same angle as each of the four blades 721. Further, the upper arm 731 includes a brake portion 731*a*, which is configured to be engaged with one of the upper gear bottoms 722*b* of the upper ratchet gear 722. The brake portion 731*a* of the upper arm 731 is engaged with one of the upper gear bottoms 722*b* of the upper ratchet gear 722, and thereby one of the blades 721 of the impeller 72 is held at a retention angle, at which the one of the blades protrudes most inwardly in the width direction (FIG. 6). At the retention angle, the protruding end of the blade 721 that protrudes most inwardly in the width-direction is positioned more inwardly than the edge of the cut-off paper P2 in the width direction (see FIG. 10*a*). The detection switch 733 is configured to detect that the upper arm 731 is maintained at the retention angle. Two ribs 78*b* for guiding the printed part of paper that is being discharged are provided on the stacker frame 78. The printed part of paper is discharged while being guided by one of the blades 721 protruding most inwardly in the width-direction and the ribs 78*b*.

FIG. 6 is a plan view showing mechanism components arranged in the movable blade unit 16 and a stacker-side driving force transferring mechanism 74. Further, the stacker frame 78, the guide member 75, and the fixed blade 71 are also shown in FIG. 6.

As shown in FIG. 6, the movable blade unit 16 includes the movable blade 161, driving means 162 for moving the movable blade 161 in a reciprocating manner, a U-shaped arm 163, which defines a part of a driving force transferring mechanism 70 (see FIG. 8) to be described below, and a link supporting shaft 164. The driving means 162 includes a motor 165, a worm gear 166 fixed to an output shaft of the motor 165, a worm wheel 167 engaged with the worm gear 166, a swing link 168 swinging around the link supporting shaft 164 by rotation of the worm wheel 167, and an origin sensor 169. As the motor 165 rotates, the movable blade 161 moves toward the fixed blade 71 in a forward direction and away from the fixed blade 71 in a backward direction. FIG. 6 shows the movable blade 161 in a stand-by position, which is the most retracted position in the backward direction. As the movable blade 161 moves in the forward direction, the paper P1 is cut along its width direction and the printed part of paper is separated away to be the cut-off paper P2. The origin sensor 169 is configured to detect that the movable blade 161 is in the stand-by position. The U-shaped arm 163 is coupled to the movable blade 161 by two connection shafts 160 to so as to move together with the movable blade 161 in a reciprocating manner. Connection pins 163*a*, which are inserted into connection holes 741*b* of joints 741 to be described below, are provided at two front end portions of the U-shaped arm 163. Further, it is desirable to prohibit the cover frames 4 from being opened while the paper P1 is being cut for a user's safety. In order to prevent the cover frames 4 from being opened while the paper is being cut, there may be provided a block member on the U-shaped arm 163 and a concave portion engaging with the block member on the cover frame 4. The block member may be engaged with the concave portion while the U-shaped arm 163 is moving in the forward direction or backward direction (i.e. the movable blade 161 is not in the stand-by position), and the block member may be not engaged with the concave portion when the movable blade is in the stand-by position. With these configurations, the cover frames 4 are prevented from being opened while the paper P1 is being cut.

The stacker-side driving force transferring mechanism 74 is configured to transfer a driving force that is used to move the U-shaped arm 163 in the backward direction to the impeller 72 so as to rotate the impeller 72. Two stacker-side driving force transferring mechanisms 74 are horizontally symmetrically provided corresponding to two impellers 72. Hereinafter, the stacker-side driving force transferring mechanism 74 on the right side in FIG. 6 will be described and a description of the stacker-side driving force transferring mechanism 74 on the left side in FIG. 6 will be omitted. The stacker-side driving force transferring mechanism 74 includes the joint 741, a lower arm 742, a lower arm supporting shaft 743, a joint spring 744 (see FIGS. 7*a*~7*d*), and an arm spring 745. The stacker-side driving force transferring mechanism 74 further includes a connection frame 740. The connection frame 740 is mounted on the stacker frame 78 to be movable in the vertical direction in FIG. 6. The connection frame 740 is normally urged downward in FIG. 6 by a spring (not shown). The components 741 to 745 that constitute the stacker-side driving force transferring mechanism 74 are mounted on the connection frame 740.

The lower arm supporting shaft 743 has a shaft line in the vertical direction (the direction perpendicular to the paper plane in FIG. 6) and is fixed to the connection frame 740. The lower arm 742 is mounted on the connection frame 740 to be rotatable on the lower arm supporting shaft 743 as a center of rotation. The lower arm 742 is provided with a claw portion 742*a* engaging with the lower ratchet gear 723. The engagement of the lower ratchet gear 723 and the claw portion 742*a* will be described in detail below. Further, the lower arm 742 is normally urged by the arm spring 745 so that the claw portion 742*a* is rotated inwardly in the width direction. The lower arm 742 is, however, configured to contact a stopping portion 740*a* of the connection frame 740 so that the lower arm 742 cannot further rotate beyond the predetermined rotational angle. FIG. 6 shows a state in which the lower arm 742 is in contact with the stopping portion 740*a* and its rotation is stopped.

Figure 7A:
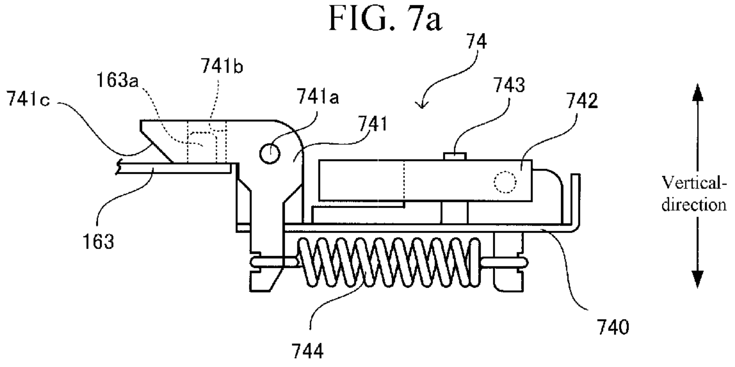

FIGS. 7*a*~7*d* are side views of the stacker-side driving force transferring mechanism 74 viewed from the right side in FIG. 6, and FIG. 7*a* is a diagram showing a state in which the cover frames 4 are closed.

As shown in FIG. 7*a*, the joint 741 is mounted on the connection frame 740 to be rotatable on a joint supporting shaft 741*a* as a center of rotation. Further, the joint 741 is normally urged in the counterclockwise direction in FIG. 7*a* by the joint spring 744. The connection hole 741*b* is formed in the joint 741. In the closed state in which the cover frame 4 is closed, the connection pin 163*a* of the U-shaped arm 163 is engaged with the connection hole 741*b* and the stacker-side driving force transferring mechanism 74 and the U-shaped arm 163 are coupled to each other.

Figure 7B:
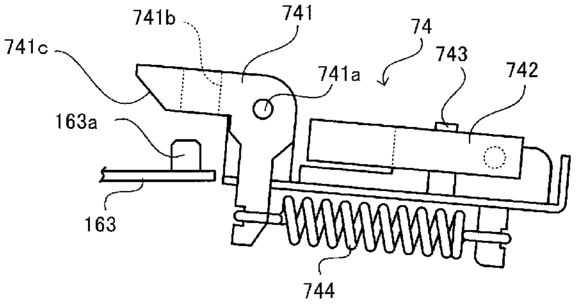

FIG. 7*b* is a diagram showing a state right before the cover frames 4 come to the closed state from an open state.

As shown in FIG. 7*b*, when the cover is in the open state, the joint 741 is separated from the U-shaped arm 163, and the stacker-side driving force transferring mechanism 74 and the U-shaped arm 163 are not coupled each other.

Figure 7C:
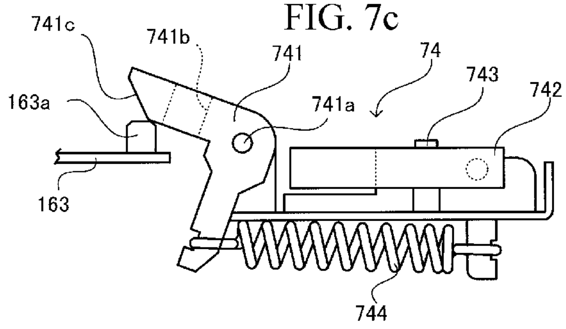

FIG. 7*c* is a diagram showing a state in which the joint 741 has come off the connection pin 163*a* of the U-shaped arm 163.

If the U-shaped arm 163 is moved while the stacker-side driving force transferring mechanism 74 is subject to increased load due to a certain factor, the joint 741 is configured to rotate in the clockwise direction in FIG. 7*c* against the urging force of the joint spring 744. By the rotation of the joint 741, the stacker-side driving force transferring mechanism 74 and the U-shaped arm 163 will be in a decoupled state as shown in FIG. 7*c*. That is, in this embodiment, the joint 741 corresponds to one example of the "transfer releasing unit". The joint 741 rotates in the clockwise direction in FIG. 7*c* to prevent the driving means 162, the stacker-side driving force transferring mechanism 74, or the U-shaped arm 163 from being damaged. Further, as an example of the factor that increases the load of the stacker-side driving force transferring mechanism 74, it may be considered that the number of stacked cut-off papers P3 exceeds the permissible limit of the paper stacking portion 77 and thereby the stacked cut-off papers P3 and the impeller 72 contact each other to increase a rotational load of the impeller 72.

A guiding slope 741*c* is formed on the surface of the joint 741. The guiding slope 741*c* is a surface for rotating the joint 741 in the clockwise direction in FIG. 7*c* when the U-shaped arm 163 in the decoupled state is moved in the forward direction.

Figure 7D:
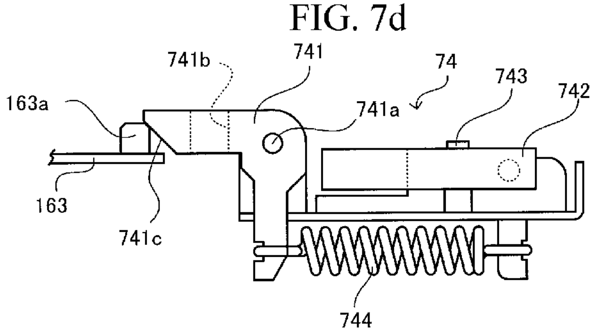

FIG. 7*d* is a diagram showing a state in which the guiding slope 741*c* of the joint 741 contacts the connection pin 163*a*.

When the U-shaped arm 163 in the decoupled stated moves in the backward direction, it may be brought into contact with the guiding slope 741*c* of the joint 741 as shown in FIG. 7*d*. In this state, if the U-shaped arm 163 moves in the forward direction, the joint 741 will rotate in the clockwise direction in FIG. 7*d* so that the connection pin 163*a* is brought into engagement with the connection hole 741*b*. The stacker-side driving force transferring mechanism 74 and the U-shaped arm 163 are thereby coupled again.

Figure 8C:
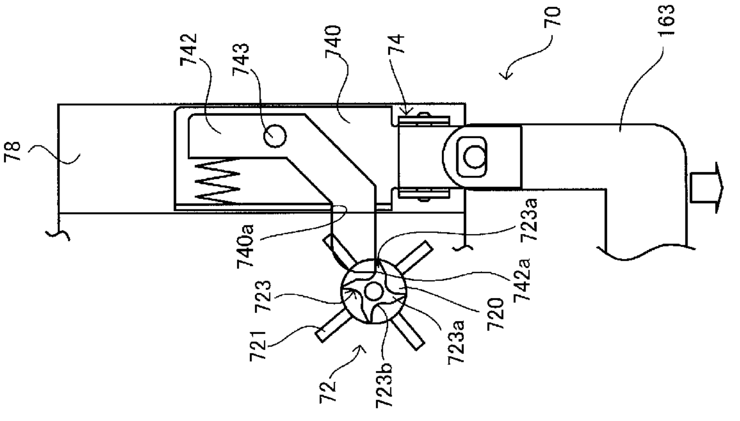
Figure 8B:
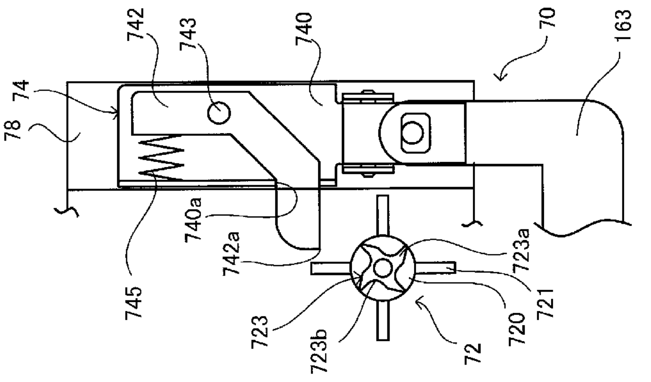
Figure 8A:
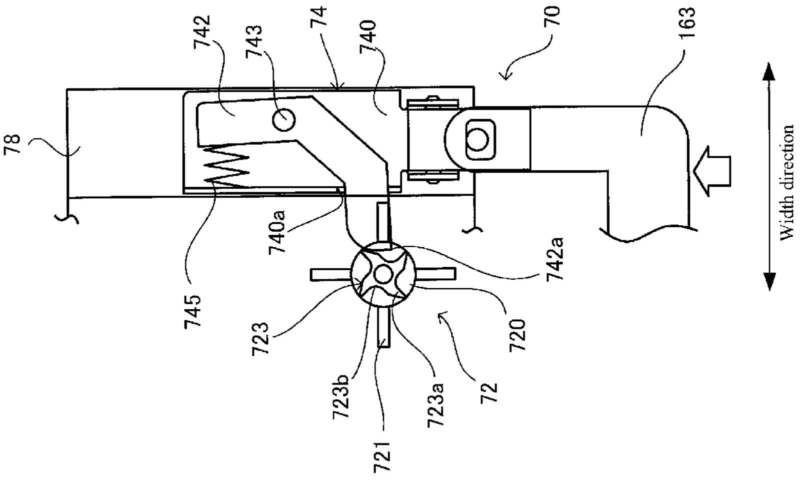

FIGS. 8*a*~8*c* are plan views showing movements of the driving force transferring mechanism 70 and the impeller 72 when the driving means 162 are operated to move the movable blade 161 in the reciprocating manner; FIG. 8*a* is a diagram showing a state when the movable blade 161 is moving in the forward direction, FIG. 8*b* is a diagram showing a state when the movable blade 161 has moved to the maximum in the forward direction, and FIG. 8*c* is a diagram showing a state when the movable blade 161 is moving in the backward direction. Arrows having a white blank therein shown in FIGS. 8*a* and 8*c* indicate a movement direction of the driving force transferring mechanism 70. Further, in FIGS. 8*a*~8*c*, the right one of the two impellers 72 shown in FIG. 6 and the driving force transferring mechanism 70 for rotating the impeller 72 are shown. Moreover, the lower ratchet gear 723, which is not viewed in the plan view in reality, and other portions that are not viewed in reality due to overlapping of components are illustrated in FIGS. 8*a*~8*c* for explanation.

The driving force transferring mechanism 70 includes the U-shaped arm 163 and the stacker-side driving force transferring mechanism 74. The driving force transferring mechanism 70 is configured to transfer a driving force of the driving means 162 shown in FIG. 6 for moving the movable blade 161 in the backward direction to the impeller 72 so as to rotate the impeller 72. As shown in FIGS. 8*a*~8*c*, the impeller 72 is provided with the lower ratchet gear 723 at a lower end portion of the shaft member 720 thereof. The lower ratchet gear 723 includes four lower gear portions 723*a*, each of which is disposed at an angle deviated from each of the four blades 721 by substantially 45 degrees, and four lower gear bottoms 723*b*, each of which is disposed at substantially the same angle as each of the four blades 721. Further, the lower ratchet gear 723 has the same shape as the upper ratchet gear 722. When the movable blade 161 is driven to move in the reciprocating manner by the driving means 162, the driving force transferring mechanism 70 also moves in the reciprocating manner together with the movable blade 161. When the stacker-side driving force transferring mechanism 74 moves in the forward direction, the lower arm 742 contacts the lower ratchet gear 723 to rotate the impeller 72 in an attempt. However, the impeller 72 is held with a predetermined force by the angle retention mechanism 73 as described above. Thus, as shown in FIG. 8*a*, the lower arm 742 rotates in the counterclockwise direction in FIG. 8*a* against the force of the arm spring 745 and thereby the driving force of the driving means 162 is prevented from being transferred to the impeller 72. That is, in this embodiment, the lower arm 742 corresponds to one example of the "transfer preventing means". When the movable blade 161 is driven to move in the forward direction, the driving force is not transferred to the impeller 72, reducing a load applied to the driving means 162. Further, since a load to cut the discharged printed part off with the movable blade 161 and a load to rotate the impeller 72 are not simultaneously applied to the driving means 162, the maximum load applied to the driving means 162 may also be reduced.

After the movable blade 161 and the driving force transferring mechanism 70 move to the maximum in the forward direction shown in FIG. 8*b*, the movable blade 161 and the driving force transferring mechanism 70 start to move in the backward direction. By the movement in the backward direction, the claw portion 742*a* of the lower arm 742 is brought into engagement with one of the lower gear portions 723*a* of the lower ratchet gear 723 and then the impeller 72 rotates in the clockwise direction in FIG. 8*c*, as shown in FIG. 8*c*. As the U-shaped arm 163 further moves in the backward direction to rotate the impeller 72 about 90 degrees, engagement of the claw portion 742*a* of the lower arm 742 with the lower gear portion 723*a* of the lower ratchet gear 723 is released. Meanwhile, the brake portion 731*a* of the upper arm 731 shown in FIG. 5 is brought into engagement with one of the upper gear bottoms 722*b* of the upper ratchet gear 722 to hold the impeller 72 in a state of being rotated by 90 degrees. Since each of the blades 721 is disposed every 90 degrees, one of the blades 721 always protrudes most inwardly in the width-direction even in this state. Further, although the lower arm 742 receives a reaction force rotating in the clockwise direction in FIG. 8*c* from the impeller 72, the lower arm 742 does not further rotate in the clockwise direction than is shown in FIG. 8*c* due to engagement with the stopping portion 740*a* of the connection frame 740.

Figure 9:
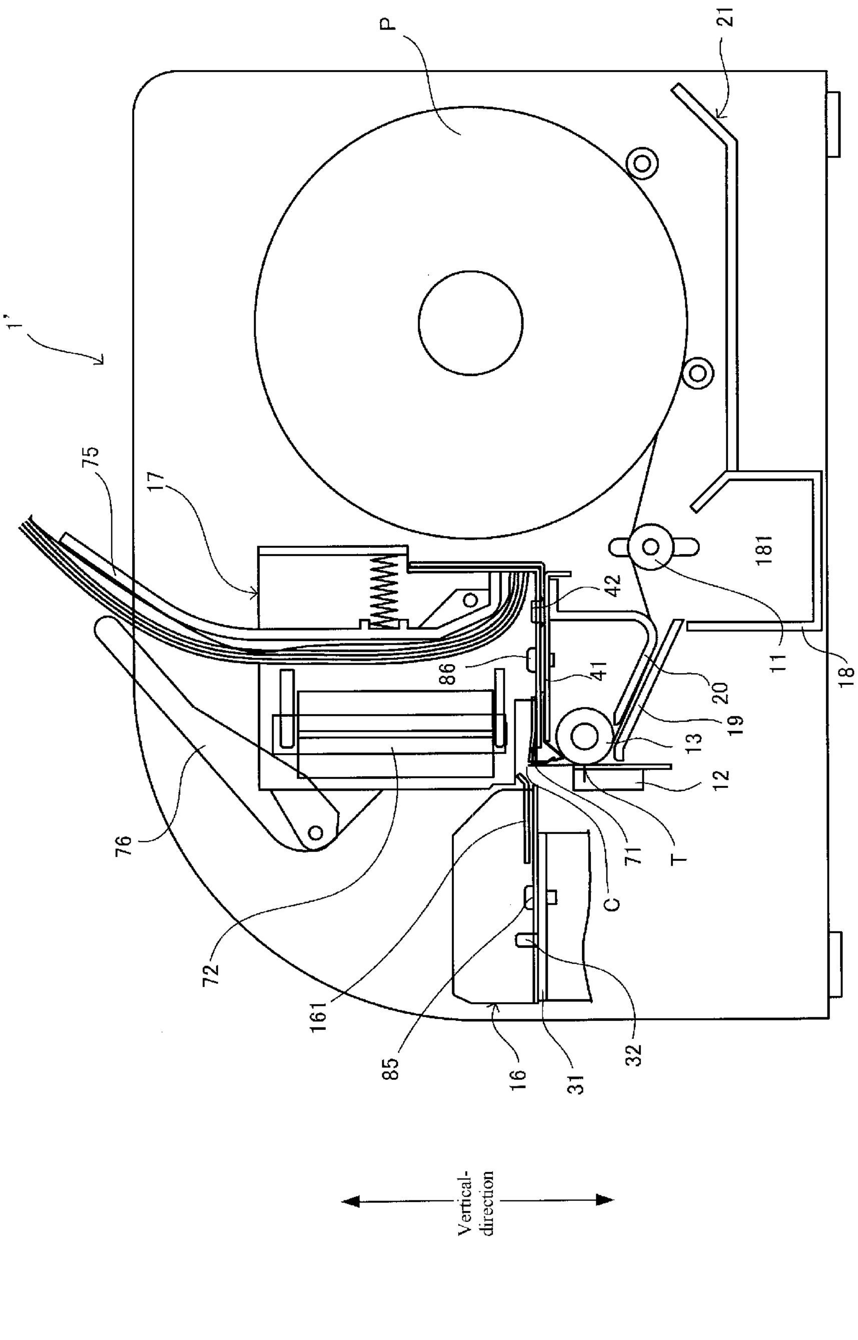
FIG. 9 is a schematic diagram showing a printer in which a reading unit and an opposite unit are removed from the printer of FIG. 3.

FIG. 9 is a schematic diagram showing a printer 1' in which the reading unit 14 and the opposite unit 15 are removed from the printer 1 of FIG. 3.

In the printer 1' shown in FIG. 9, the movable blade unit 16 is detachably attached to the body-side attachment portion 31 to which the reading unit 14 is attached in FIG. 3. The positioning hole formed in the movable blade unit 16 is engaged with the positioning shaft 32 so that the movable blade unit 16 is positioned with respect to the body-side attachment portion 31. The movable blade unit 16 is detachably attached to the body-side attachment portion 31 by a screw 85. The movable blade unit 16 is detached from the body-side attachment portion 31 by removing the screw 85. The movable blade unit 16 is attached to the body-side attachment portion 31 so that the movable blade unit 16 is disposed on a downstream side of the printing head 12 in the paper feed direction. The movable blade unit 16 is mounted on the body frames 3 while being positioned with respect to the body-side attachment portion 31. This position of the movable blade unit 16 corresponds to one example of the "first position".

Further, in the printer 1' shown in FIG. 9, the stacker unit 17 is detachably attached to the cover-side attachment portion 41 to which the opposite unit 15 is attached in FIG. 3. The protrusion portion 42 is engaged with the second positioning hole formed in the stacker unit 17 so that the stacker unit 17 is positioned with respect to the cover-side attachment portion 41. Further, the stacker unit 17 is detachably attached to the cover-side attachment portion 41 by a screw 86. The stacker unit 17 is detached from the cover-side attachment portion 41 by removing the screw 86. The stacker unit 17 is attached to the cover-side attachment portion 41 so that the stacker unit 17 is disposed on a downstream side of the platen roller 13. The stacker unit 17 is mounted on the cover frames 4 while being positioned with respect to the cover-side attachment portion 41. This position of the stacker unit 17 corresponds to one example of the "third position".

In the printer 1' shown in FIG. 9, the attachment positions of the movable blade unit 16 and the stacker unit 17 have been changed in comparison with the printer 1 shown in FIG. 3. This configuration allows a cutting position C (the same as the position of the discharge port 5) to be placed closer to a printing position T, wherein the cutting position C indicates a position where the movable blade 161 cuts and separates the discharged printed part of the paper from the non-discharged part, and the printing position T indicates a position where the printing head 12 performs a printing operation. If the cutting position C is undesirably spaced apart from the printing position T, a blank space that is not printed by the printing head 12 increases. The blank space may be reduced prior to the start of the printing operation by feeding the paper P1 in a reverse paper feed direction until the front end portion of the paper P1 reaches the printing position T, but this causes a delay in starting the printing operation and results in reduction of throughput. The closer arrangement of the cutting position C and the printing position T can reduce the blank space. Due to reduced blank space, time required to reverse the paper P1 in the reverse paper feed direction can be reduced, thereby suppressing the reduction of throughput.

The movable blade unit 16 is attached to the body-side attachment portion 31 so that the movable blade 161 is disposed at a predetermined position in the proximity of the printing position T. Further, since the stacker unit 17 is attached to the cover-side attachment portion 41, the fixed blade 71 is disposed opposite to the movable blade 161 which is disposed at the predetermined position in the proximity of the printing position T while the paper P1 is sandwiched by the fixed blade 71 and the movable blade 161.

Hereinafter, the sequence of removing the reading unit 14 and the opposite unit 15 from the printer 1 shown in FIG. 3 to organize the printer 1' shown in FIG. 9 will be described. First, the elongated screw 81 shown in FIG. 3 is removed and the movable blade unit 16 and the reading unit 14 are detached from the printer 1. Then, the screw 84 is removed to detach the stacker unit 17 from the printer 1, and the screw 83 is removed to detach the opposite unit 15 from the printer 1. Subsequently, the positioning hole formed in the movable blade unit 16 is engaged with the positioning shaft 32 on the body-side attachment portion 31, and the movable blade unit 16 is attached to the body-side attachment portion 31 by the screw 85 shown in FIG. 9. Further, the second positioning hole formed in the stacker unit 17 is engaged with the protrusion portion 42 on the cover-side attachment portion 41 and the stacker unit 17 is attached to the cover-side attachment portion 41 by the screw 86. The printer 1' shown in FIG. 9 can be changed back to the printer 1 shown in FIG. 3 in a reverse sequence to the above sequence.

Here, an operation of the printer 1 in this embodiment is described. With respect to an operation of the printer 1' shown in FIG. 9 which is made by removing the reading unit 14 and the opposite unit 15 from the printer 1 shown in FIG. 3, only the differences from the printer 1 shown in FIG. 3 are described. The printer 1 which has received a printing command feeds the paper P1 in the reverse paper feed direction by reversely rotating the platen roller 13 shown in FIG. 3 until the front end portion of the paper P1 reaches a position between the printing head 12 and the platen roller 13. This operation reduces a blank space on the front end portion of the paper P1. In the printer 1' shown in FIG. 9, the feeding distance of the paper P1 in the reverse paper feed direction is comparatively short due to the arrangement of the cutting position C in the proximity of the printing position T. There may be no need for the reverse feeding of the paper P1. Therefore, the throughput of the printer 1' may be further improved compared to the printer 1. Thereafter, by the positive rotation of the platen roller 13, the paper P1 is discharged from the discharge port 5 while the printer 1 performs the printing operation by the printing head 12 and the reading operation by the reading unit 14. As the platen roller 13 is rotated, the printed part of paper discharged from the discharge port 5 is guided toward the press member 76 in the discharging direction by the blade 721 that protrudes most inwardly in the width-direction and the ribs 78*b*. Then, the printed part of paper that protrudes above the impeller 72 is guided along the bottom surface 76*a* of the press member 76 toward the guide member 75. A portion that reaches the guide member 75 is guided along the guide member 75. After the printing operation is completed, the platen roller 13 stops when the printed part of the paper P1 is entirely discharged from the discharge port 5. Further, if a printing error is detected in the reading operation by the reading unit 14, the printer stops the printing operation and performs a predetermined procedure such as an error notification. In the printer 1' shown in FIG. 9, the reading operation by the reading unit 14 and the predetermined procedure are not implemented.

After the platen roller 13 stops, the motor 165 of the driving means 162 is driven to move the driving force transferring mechanism 70 together with the movable blade 161 in the forward direction to cut and separate the discharged printed part of paper from the non-discharged portion thereof. By the continuous driving of the motor 165, the movable blade 161 and the driving force transferring mechanism 70 move back in the backward direction. As the driving force transferring mechanism 70 further moves in the backward direction, the claw portion 742*a* of the lower arm 742 is brought into engagement with one of the lower gear portions 723*a* of the lower ratchet gear 723, thereby causing the impeller 72 to rotate.

Figure 10A:
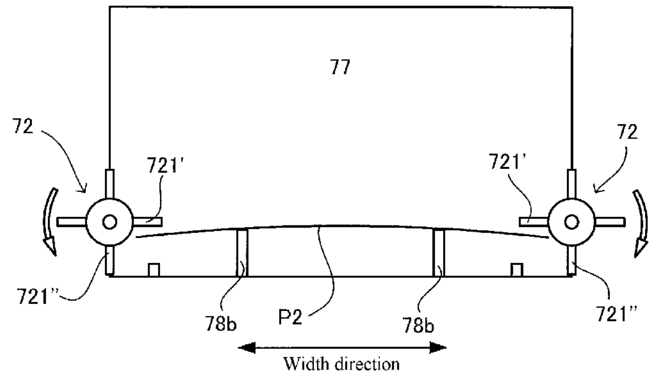
Figure 10B:
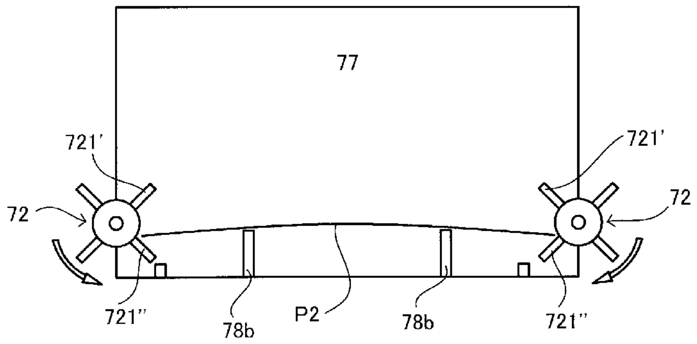
Figure 10C:
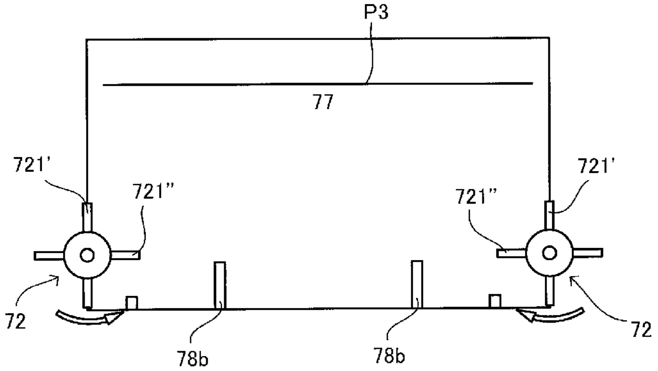

FIGS. 10*a*~10*c* are plan views showing a state in which the impeller 72 rotates to push the cut-off paper P2 in the paper thickness direction; FIG. 10*a* is a diagram showing a state right before the impeller 72 starts rotating, FIG. 10*b* is a diagram showing a state in which the impeller 72 is rotating, and FIG. 10*c* is a diagram showing a state in which the rotation of the impeller 72 is completed. The cut-off paper P2 shown in FIGS. 10*a*~10*c* is a portion that is pushed by the blades 721. Further, FIGS. 10*a*~10*c* include arrows having a white blank therein each of which indicates a rotational direction of the impeller 72 in each of FIGS. 10*a*~10*c*.

As shown in FIG. 10*a*, the impeller 72 before starting rotation is held at an angle such that one of the blades 721 protrudes most inwardly in the width-direction. Hereinafter, the blade that protrudes most inwardly in the width-direction before starting rotation is referred to as a pre-rotation protruding blade 721'. Further, a protruding end of the pre-rotation protruding blade 721' is positioned more inwardly than the edge of the cut-off paper P2 in the width-direction. The cut-off paper P2 is positioned on the upstream side of the pre-rotation protruding blade 721' in the pushing direction. As shown in FIG. 10*b*, as the impeller 72 rotates, the pre-rotation protruding blade 721' moves outwardly in the width-direction. Meanwhile, another one of the blades 721 (hereinafter referred to as a post-rotation protruding blade 721") disposed with an angle of 90 degrees in the reverse rotational direction with respect to the pre-rotation protruding blade 721' is rotated from the upstream side in the pushing direction toward the cut-off paper P2. In this way, the post-rotation protruding blade 721" pushes the cut-off paper P2 in the pushing direction into the paper stacking portion 77. The cut-off paper is stacked in the paper stacking portion 77 as a stacked cut-off paper P3. As shown in FIG. 10*c*, after the impeller 72 is rotated by 90 degrees, the pre-rotation protruding blade 721' is positioned outwardly in the width direction of the stacked cut-off papers P3 and the post-rotation protruding blade 721" is held at an angle so as to protrude most inwardly in the width-direction.

In the printer 1, when the origin sensor 169 detects that the movable blade 161 is at the stand-by position, the motor 165 stops. The detection switch 733 detects whether each of the two upper arms 731 are held at the retention angle. When each of the upper arms 731 are held at the retention angle, the process ends. When the each of the upper arms 731 are not held at the retention angle, the motor 165 of the driving means 162 is driven to move the driving force transferring mechanism 70 together with the movable blade 161 in the reciprocating manner so that the movable blade 161 is again moved to the stand-by position. Then, the detection switch 733 again detects whether each of the two upper arms 731 are held at the retention angle. When each of the upper arms 731 are held at the retention angle, the process ends. When each of the upper arms 731 are not held at the retention angle, an error is notified. Such error likely occurs when the stacker-side driving force transferring mechanism 74 is not coupled with the U-shaped arm 163. By reciprocating the driving force transferring mechanism 70 once, the coupled state of the stacker-side driving force transferring mechanism 74 and the U-shaped arm 163 is restored, allowing the two upper arms 731 to be rotated to the retention angle.

As described above, according to the configuration of the embodiments, since the driving means 162 rotates the impeller 72 using the driving force moving the movable blade 161 in the backward direction, the cut-off paper P2 may be pushed into the paper stacking portion 77 without an additional power source to rotate the impeller 72. In addition, load distribution reduces the maximum load applied on the driving means 162. Particularly, the movement of the movable blade 161 in the forward direction is subject to a load to cut the printed part off by the movable blade 161 while the movement of the movable blade 161 in the backward direction is subject to a load to push the cut-off paper P2 by the impeller 72. Moreover, since the cut-off paper P2 is pushed toward the paper stacking portion 77 after being completely cut and separated by the movable blade 161, it is not required to adjust the timing of completing the cut-off and the timing of the pushing, which would be required in case of rotating the impeller 72 using an additional power source. Further, the pre-rotation protruding blade 721' prevents the cut-off papers P3 stacked in the paper stacking portion 77 from moving to the discharge port 5 when the printed part of the paper P1 is discharged from the discharge port 5. Moreover, the pre-rotation protruding blade 721' guides the discharged printed part of paper in the discharge direction toward the press member 76. By only rotating the impeller 72, the cut-off paper P2 can be pushed by the post-rotation protruding blade 721" while retracting the pre-rotation protruding blade 721' from the pushing direction of the cut-off paper P2.

Further, according to the embodiments, since the fixed blade 71 is fixed to the stacker unit 17, the fixed blade 71 and the paper stacking portion 77 do not need to be separately attached to the printer and thus the assembly efficiency of attaching the fixed blade 71 and the paper stacking portion 77 to the printer is improved. In particular, the change of the mounting positions of the fixed blade 71 and the paper stacking portion 77 can be easily accomplished by only detaching the stacker unit 17 and attaching it to another position without requiring positional alignment between the fixed blade 71 and the paper stacking portion 77, and thereby the assembly efficiency is remarkably improved. In addition, according to the embodiment of the printer 1, since the reading unit 14 is provided with the movable blade unit attachment portion 14*a*, the movable blade unit 16 can be stacked on the reading unit 14 and thus they are arranged close to each other. Further, since the opposite unit 15 is provided with the stacker unit attachment portion 15*a*, the stacker unit 17 can be stacked on the opposite unit 15 and thus they are arranged close to each other. Further, even in the printer 1 provided with the reading unit 14 and the opposite unit 15, the cutting position C and the printing position T can be provided in the proximity by the close arrangement of the reading unit 14 and the movable blade unit 16 and of the opposite unit 15 and the stacker unit 17. As a result, when the paper P1 is reversed in the reverse paper feed direction to reduce the blank space, the moving distance of the paper P1 is shortened and the throughput of the printer 1 is improved.

The present invention is not limited to the above-mentioned embodiments, and various modifications can be made within the scope of the following claims. For example, although the impeller 72 is used as the pushing member in the embodiments, other pushing members, such as a plate-shaped pushing piece which is configured to move, for example, in parallel to the movement direction of the movable blade 161 and in an opposite direction to the movement direction, may be used. Further, although four blades 721 are provided in the embodiments, the number of blades 721 may be 1 to 3, or 5 or more. Moreover, although the thermal printing head 12 is used in the embodiments, other types of printing heads such as an impact dot type may also be used. In addition, although the embodiments employ a so-called guillotine-type cutting mechanism such that the movable blade 161 moves in a translational motion toward the fixed blade 71, a scissors-type cutting mechanism or a pizza-type cutting mechanism in which the movable blade moves in a rotational motion may be used. Further, although the platen roller 13 is used in the embodiments, a plate-shaped platen may be used. Moreover, a conveyance roller rotated by the motor may be added apart from the platen roller 13. Also, although the reading unit 14, the opposite unit 15, the movable blade unit 16, and the stacker unit 17 are attached by a screw in the embodiments, they may be attached by other removable attaching means such as fittings. Further, the body frames 3, instead of the reading unit 14, may be provided with the movable blade unit attachment portion 14*a*. In addition, the cover frames 4, instead of the opposite unit 15, may be provided with the stacker unit attachment portion 15*a*. The reading unit 14 may be mounted on the cover frames 4 and the opposite unit 15 may be mounted on the body frames 3. The movable blade unit 16 may be mounted on the cover frames 4 and the stacker unit 17 may be mounted on the body frames 3. The above-mentioned modifications may be appropriately combined.

What is claimed is:

1. A printer configured to print on paper drawn from a paper roll and separate the printed part of the paper as a cut-off paper, comprising:

a movable blade for cutting the paper disposed between a fixed blade and the movable blade as the movable blade moves in a forward direction and thereby separating the printed part of the paper as a cut-off paper;

driving means for moving the movable blade in a reciprocating manner;

a pushing member configured to be driven to push the cut-off paper in a pushing direction, the pushing direction being a thickness direction of the paper;

a paper stacking portion for storing the cut-off paper pushed by the pushing member in a stacked manner; and a driving force transferring mechanism for transferring a driving force of the driving means to the pushing member so that the pushing member is thereby driven.

2. The printer of claim 1, wherein the driving force of the driving means transferred to the pushing member is a driving force for moving the movable blade in a backward direction.

3. The printer of claim 2, wherein the driving force transferring mechanism includes a transfer preventing unit for preventing the driving force from being transferred to the pushing member when the driving means moves the movable blade in a forward direction.

4. The printer of claim 2, further comprising a discharge port through which the printed part of the paper is discharged, wherein the pushing member is rotatably mounted in the proximity of either end of the discharge port and on the paper stacking portion side thereof, and the pushing member is configured to guide the printed part of the paper discharged from the discharge port in a discharging direction and then push the cut-off paper in the pushing direction when the pushing member is rotatably driven by the driving force transferring mechanism.

5. The printer of claim 2, wherein the driving force transferring mechanism comprises a transfer releasing unit for releasing the transfer of the driving force to the pushing member when a load caused by operation of the pushing member is equal to or larger than a predetermined load.

6. The printer of claim 2, wherein the paper stacking portion comprises a concave portion which is recessed in the pushing direction, and the concave portion is adapted to receive a cut end portion of the cut-off paper that tends to be curled.

7. The printer of claim 2, further comprising a stacker unit including the paper stacking portion against which the cut-off papers stand in an stacked manner, wherein the stacker unit comprises:

a guide member against which one of the stacked cut-off papers at the most downstream side in the pushing direction stands;

a press member adapted to contact a surface of one of the stacked cut-off papers at the most upstream side in the pushing direction;

and a retracting mechanism for retracting the guide member in the pushing direction so that the press member contacts the surface of the cut-off paper at the most upstream side at a predetermined angle range.

8. The printer of claim 1, wherein the driving force transferring mechanism includes a transfer preventing unit for preventing the driving force from being transferred to the pushing member when the driving means moves the movable blade in a forward direction.

9. The printer of claim 8, further comprising a discharge port through which the printed part of the paper is discharged, wherein the pushing member is rotatably mounted in the proximity of either end of the discharge port and on the paper stacking portion side thereof, and the pushing member is configured to guide the printed part of the paper discharged from the discharge port in a discharging direction and then push the cut-off paper in the pushing direction when the pushing member is rotatably driven by the driving force transferring mechanism.

10. The printer of claim 8, wherein the driving force transferring mechanism comprises a transfer releasing unit for releasing the transfer of the driving force to the pushing member when a load caused by operation of the pushing member is equal to or larger than a predetermined load.

11. The printer of claim 8, wherein the paper stacking portion comprises a concave portion which is recessed in the pushing direction, and the concave portion is adapted to receive a cut end portion of the cut-off paper that tends to be curled.

12. The printer of claim 8, further comprising a stacker unit including the paper stacking portion against which the cut-off papers stand in an stacked manner, wherein the stacker unit comprises:

a guide member against which one of the stacked cut-off papers at the most downstream side in the pushing direction stands;

a press member adapted to contact a surface of one of the stacked cut-off papers at the most upstream side in the pushing direction;

and a retracting mechanism for retracting the guide member in the pushing direction so that the press member contacts the surface of the cut-off paper at the most upstream side at a predetermined angle range.

13. The printer of claim 1, further comprising a discharge port through which the printed part of the paper is discharged, wherein the pushing member is rotatably mounted in the proximity of either end of the discharge port and on the paper stacking portion side thereof, and the pushing member is configured to guide the printed part of the paper discharged from the discharge port in a discharging direction and then push the cut-off paper in the pushing direction when the pushing member is rotatably driven by the driving force transferring mechanism.

14. The printer of claim 13, wherein the driving force transferring mechanism comprises a transfer releasing unit for releasing the transfer of the driving force to the pushing member when a load caused by operation of the pushing member is equal to or larger than a predetermined load.

15. The printer of claim 13, wherein the paper stacking portion comprises a concave portion which is recessed in the pushing direction, and the concave portion is adapted to receive a cut end portion of the cut-off paper that tends to be curled.

16. The printer of claim 13, further comprising a stacker unit including the paper stacking portion against which the cut-off papers stand in an stacked manner, wherein the stacker unit comprises:

a guide member against which one of the stacked cut-off papers at the most downstream side in the pushing direction stands;

a press member adapted to contact a surface of one of the stacked cut-off papers at the most upstream side in the pushing direction;

and a retracting mechanism for retracting the guide member in the pushing direction so that the press member contacts the surface of the cut-off paper at the most upstream side at a predetermined angle range.

17. The printer of claim 1, wherein the driving force transferring mechanism comprises a transfer releasing unit for releasing the transfer of the driving force to the pushing member when a load caused by operation of the pushing member is equal to or larger than a predetermined load.

18. The printer of claim 17, wherein the paper stacking portion comprises a concave portion which is recessed in the pushing direction, and the concave portion is adapted to receive a cut end portion of the cut-off paper that tends to be curled.

19. The printer of claim 17, further comprising a stacker unit including the paper stacking portion against which the cut-off papers stand in an stacked manner, wherein the stacker unit comprises:

a guide member against which one of the stacked cut-off papers at the most downstream side in the pushing direction stands;

a press member adapted to contact a surface of one of the stacked cut-off papers at the most upstream side in the pushing direction;

and a retracting mechanism for retracting the guide member in the pushing direction so that the press member contacts the surface of the cut-off paper at the most upstream side at a predetermined angle range.

20. The printer of claim 1, wherein the paper stacking portion comprises a concave portion which is recessed in the pushing direction, and the concave portion is adapted to receive a cut end portion of the cut-off paper that tends to be curled.

21. The printer of claim 20, further comprising a stacker unit including the paper stacking portion against which the cut-off papers stand in an stacked manner, wherein the stacker unit comprises:

a guide member against which one of the stacked cut-off papers at the most downstream side in the pushing direction stands;

a press member adapted to contact a surface of one of the stacked cut-off papers at the most upstream side in the pushing direction;

and a retracting mechanism for retracting the guide member in the pushing direction so that the press member contacts the surface of the cut-off paper at the most upstream side at a predetermined angle range.

22. The printer of claim 1, further comprising a stacker unit including the paper stacking portion against which the cut-off papers stand in an stacked manner, wherein the stacker unit comprises:

a guide member against which one of the stacked cut-off papers at the most downstream side in the pushing direction stands;

a press member adapted to contact a surface of one of the stacked cut-off papers at the most upstream side in the pushing direction;

and a retracting mechanism for retracting the guide member in the pushing direction so that the press member contacts the surface of the cut-off paper at the most upstream side at a predetermined angle range.

* * * * *